United States Patent
Tsuchida et al.

(10) Patent No.: US 11,319,384 B2
(45) Date of Patent: *May 3, 2022

(54) METHOD FOR PRODUCING HYPROMELLOSE PHTHALATE

(71) Applicant: SHIN-ETSU CHEMICAL CO., LTD., Tokyo (JP)

(72) Inventors: Akiko Tsuchida, Niigata (JP); Taishi Kitaguchi, Niigata (JP); Akira Kitamura, Niigata (JP); Mitsuo Narita, Niigata (JP)

(73) Assignee: SHIN-ETSU CHEMICAL CO., LTD., Tokyo (JP)

(*) Notice: Subject to any disclaimer, the term of this patent is extended or adjusted under 35 U.S.C. 154(b) by 12 days.

This patent is subject to a terminal disclaimer.

(21) Appl. No.: 16/521,237

(22) Filed: Jul. 24, 2019

(65) Prior Publication Data

US 2020/0031953 A1 Jan. 30, 2020

(30) Foreign Application Priority Data

Jul. 25, 2018 (JP) .............................. JP2018-139248

(51) Int. Cl.
*C08B 3/10* (2006.01)

(52) U.S. Cl.
CPC ..................... *C08B 3/10* (2013.01)

(58) Field of Classification Search
CPC . C08B 3/00; C08B 11/20; C08B 13/00; C08L 1/32

USPC .......................................................... 536/63
See application file for complete search history.

(56) References Cited

U.S. PATENT DOCUMENTS 8,101,108 B2 * 1/2012 Otoshi ....................... C08J 5/18
264/211.23

FOREIGN PATENT DOCUMENTS

| JP | 2004527619 | 9/2004 | |
| WO | 02/085949 | 10/2002 | |
| WO | WO 02/0854941 A1 * | 10/2002 | ............. C08B 13/00 |

* cited by examiner

*Primary Examiner* — Ganapathy Krishnan
(74) *Attorney, Agent, or Firm* — Myers Bigel, P.A.

(57) ABSTRACT

There is provided a method for producing hypromellose phthalate (HPMCP), the method not requiring any special device, and facilitating removal of impurities. More specifically, there is provided a method for producing HPMCP, including an esterification step of esterifying hypromellose with a carboxybenzoylating agent in the presence of an aliphatic carboxylic acid to obtain a reaction product solution containing HPMCP; a precipitation step of precipitating the HPMCP by mixing the reaction product solution with water to obtain a suspension of the precipitated HPMCP; a neutralization step of neutralizing the suspension with a basic substance to obtain a neutralized suspension; and a washing step of washing the HPMCP contained in the neutralized suspension to obtain the washed HPMCP.

8 Claims, No Drawings

METHOD FOR PRODUCING HYPROMELLOSE PHTHALATE

RELATED APPLICATION

This application claims priority from Japanese Patent Application No. 2018-139248, filed Jul. 25, 2018, the disclosures of which is incorporated by reference herein in its entirety.

BACKGROUND OF THE INVENTION

The invention relates to a method for producing hypromellose phthalate.

Hypromellose phthalate (hereinafter also referred to as "HPMCP") is a polymer having a cellulose skeleton with ether structures formed by introduction of methyl groups ($-CH_3$) and hydroxypropyl groups ($-C_3H_6OH$), and ester structures formed by introduction of carboxybenzoyl groups ($-COC_6H_4COOH$).

HPMCP is widely used, particularly in the pharmaceutical field such as a field of coating applications in which HPMCP is used as an enteric polymer material, and a field of solid dispersions in which HPMCP is used together with a poorly water-soluble drug. Accordingly, HPMCP desirably contains minimum impurities so that it is important to efficiently remove reaction reagents, by-products and the like in a washing step in the method for producing the HPMCP.

For example, JP 2004-527619A, which is a Japanese phase publication of WO 2002/085949A, proposes the following purification method of HPMCP. Two to four percentages by weight of a fluidization solvent selected from water or a lower alcohol having 1 to 5 carbon atoms, relative to 1% by weight of hydroxypropyl methyl cellulose used for the reaction, are added to the reaction product mixture and stirred. The resulting product mixture is sprayed into 10-20% by weight of water through a spray nozzle whose air or nitrogen gas pressurization speed is from 3 to 8 L/min, and then stirred, filtered and dried.

SUMMARY OF THE INVENTION

However, the method disclosed in JP 2004-527619A requires a large amount of the reaction mixture to pass through a spray nozzle, which is undesirable in view of the productivity due to a risk of nozzle clogging by the reaction mixture. In addition, the method requires a spray nozzle and a pressurizing device, leading to complication in the equipment.

The invention has been made in these circumstances. An object of the invention is to provide a method for producing HPMCP, the method not requiring any special device, and facilitating removal of impurities.

As a result of intensive researches to attain the object described above, the inventors have found that washability of HPMCP can be improved by neutralizing a suspension of HPMCP with a basic substance in the method for producing the HPMCP, and have completed the invention.

In an aspect of the invention, there is provided a method for producing hypromellose phthalate, comprising: an esterification step of esterifying hypromellose with a carboxybenzoylating agent in the presence of an aliphatic carboxylic acid to obtain a reaction product solution containing hypromellose phthalate; a precipitation step of precipitating the hypromellose phthalate by mixing the reaction product solution with water to obtain a suspension of the precipitated hypromellose phthalate; a neutralization step of neutralizing the suspension with a basic substance to obtain a neutralized suspension; and a washing step of washing the hypromellose phthalate contained in the neutralized suspension to obtain the washed hypromellose phthalate.

According to the invention, the washability of HPMCP can be improved without any special equipment in the method for producing the HPMCP so that the HPMCP having impurities reduced can be conveniently produced.

DETAILED DESCRIPTION OF THE PREFERRED EMBODIMENTS

First, there will be described the esterification step in the method for producing HPMCP. In this step, a reaction product solution of HPMCP is obtained by esterifying hypromellose with a carboxybenzoylating agent in the presence of an aliphatic carboxylic acid.

Hypromellose (also called hydroxypropyl methylcellulose, hereinafter also abbreviated as "HPMC") is a nonionic, water-soluble cellulose ether. From a viewpoint of obtaining HPMC with a low content of insoluble fibers, HPMC has a DS of the methoxy group of preferably from 1.10 to 2.20, more preferably from 1.40 to 2.00, and still more preferably from 1.60 to 2.00. From a viewpoint of obtaining HPMC with a low content of insoluble fibers, HPMC has an MS of the hydroxypropoxy group of preferably from 0.10 to 1.00, more preferably from 0.20 to 0.80, and still more preferably from 0.20 to 0.65.

The term "DS" stands for a degree of substitution and means the number of alkoxy groups per glucose ring unit of cellulose. The term "MS" stands for a molar substitution and means the average mole number of hydroxyalkoxy groups attached per glucose ring unit of cellulose. Both the DS of methoxy groups and the MS of hydroxypropoxy groups in HPMC can be calculated from the values determined in accordance with the assay procedures described in the Japanese Pharmacopoeia 17th Edition.

HPMC has a viscosity at 20° C., as determined in a 2% by mass aqueous solution of the HPMC, of preferably from 1.0 to 30.0 mPa·s, more preferably from 2.0 to 20.0 mPa·s, from a viewpoint of kneadability in the esterification step. The viscosity at 20° C., as determined in a 2% by mass aqueous solution of the HPMC, may be determined in accordance with the viscosity measurement by capillary tube viscometer described in the Japanese Pharmacopoeia 17th Edition.

The HPMC to be used may be synthesized by a method known in the art, or may be a commercial product.

Examples of the aliphatic carboxylic acid include an aliphatic carboxylic acid having 2 to 4 carbon atoms, such as acetic acid, propionic acid and butyric acid. The acetic acid is preferred from a viewpoint of economy.

The amount of the aliphatic carboxylic acid to be used is preferably from 3.0 to 10.0 mol, more preferably from 4.0 to 8.0 mol, per mol of HPMC, from a viewpoint of dissolving HPMC and enhancing the reaction rate.

Examples of the carboxybenzoylating agent include a phthaloyl halide such as phthaloyl chloride; a monoalkyl phthalate such as monomethyl phthalate and monoethyl phthalate; and phthalic anhydride. The phthalic anhydride is preferred from a viewpoint of economy.

The amount of the carboxybenzoylating agent to be used is not particularly limited insofar as HPMCP having a desirable degree of substitution is obtained. It is preferably from 0.1 to 1.5 mol, more preferably from 0.3 to 1.2 mol, per mol of HPMC, from a viewpoint of reaction efficiency The esterification may be carried out in the presence of a catalyst. The catalyst is preferably an alkali metal salt of a carboxylic acid such as sodium acetate from a viewpoint of economy. The catalyst may be used singly or in combination of two or more. A commercially available catalyst may be used.

The amount of catalyst may be appropriately selected in consideration of the desired degree of substitution of HPMCP. It is preferably from 0.1 to 2.0 mol, more preferably from 0.3 to 1.9 mol, per mol of HPMC, from a viewpoint of reaction efficiency.

The esterification may also be carried out in the presence of a depolymerizing agent. The depolymerizing agent is preferably an alkali metal salt of chloric acid, such as sodium chlorate, from a viewpoint of economy. The depolymerizing agent may be used singly or in combination of two or more. A commercially available depolymerizing agent may be used.

The amount of depolymerizing agent may be appropriately selected in consideration of the desired degree of polymerization of HPMCP. It is preferably from 0.01 to 0.20 mol, more preferably from 0.02 to 0.10 mol, per mol of HPMC, from a viewpoint of preventing significant viscosity reduction.

The esterification is preferably carried out using a kneader reactor equipped with a twin-shaft stirrer from a viewpoint of reaction efficiency. The reaction temperature in the esterification step is preferably from 60 to 120° C., more preferably from 60 to 100° C., from a viewpoint of reaction rate. The reaction time in the esterification step is preferably from 2 to 8 hours, more preferably from 3 to 6 hours, from a viewpoint of obtaining HPMCP having a desired degree of substitution.

After the esterification reaction, an optional water may be added to the reaction product solution containing HPMCP for the purpose of treating the unreacted carboxybenzoylating agent to obtain a post-treated reaction product solution containing HPMCP. Hereinafter, the treatment with water after the esterification is also referred to as "post-treatment".

The amount of the water to be added is within the range that does not cause precipitation of HPMCP, and is preferably from 10 parts by mass to less than 250 parts by mass, more preferably from 50 to 200 parts by mass, relative to 100 parts by mass of starting HPMC, from a viewpoint of preventing a decrease in transportability due to precipitation of HPMCP.

Next, there will be described the precipitation step of precipitating HPMCP by mixing the reaction product solution containing HPMCP with water to obtain a suspension of the precipitated HPMCP.

The temperature of the water is preferably from 5 to 40° C. from a viewpoint of productivity.

The amount of the water to be used is preferably from 250 to 6,000 parts by mass, more preferably from 300 to 5,000 parts by mass, relative to 100 parts by mass of HPMC used in the esterification step, from a viewpoint of obtaining HPMCP with low impurities.

The mixing of the reaction product solution containing HPMCP with water is not particularly limited and may be carried out by any method known in the art.

Next, there will be described the neutralization step of neutralizing the suspension containing HPMCP with a basic substance to obtain a neutralized suspension.

What will be neutralized includes, for example, the aliphatic carboxylic acid used as the reaction solvent, and phthalic acid produced through hydrolysis of unreacted phthalic anhydride.

Examples of the basic substance may include any substance capable of neutralizing the suspension containing HPMCP. A basic inorganic compound and/or a basic organic compound may be used. The basic substance may be used singly or in combination of two or more. A commercially available basic substance may be used.

Examples of the basic inorganic compound include an alkali metal hydroxide such as sodium hydroxide and potassium hydroxide; an alkaline earth metal hydroxide such as magnesium hydroxide and calcium hydroxide; an alkali metal hydrogen carbonate such as sodium hydrogen carbonate and potassium hydrogen carbonate; and an alkali metal carbonate such as sodium carbonate and potassium carbonate. Examples of the basic organic compound include ammonia and an amine such as pyridine, arginine and lysine.

The basic substance is preferably an alkali metal hydroxide such as sodium hydroxide, or an alkali metal hydrogen carbonate such as sodium hydrogen carbonate from a viewpoint of economy.

The amount of the basic substance to be used is not particularly limited and may be such an amount that the neutralized suspension containing HPMCP has a pH value within the range as described below. For example, the amount may be preferably from more than 0 mol % to 80 mol %, more preferably from more than 10 mol % to 70 mol %, relative to the total moles of the aliphatic carboxylic acid and the carboxybenzoylating agent used.

When the basic substance is solid, it may be added in the solid form as it is, or may be added together with a solvent capable of dissolving the basic substance, or may be added in the solution form after dissolved in a solvent.

For example, sodium hydroxide may be dissolved in water and then used as an aqueous sodium hydroxide solution. The concentration of the aqueous sodium hydroxide solution is preferably from 0.5 to 55% by mass from a viewpoint of its handling. The temperature of the aqueous sodium hydroxide solution is preferably from 5 to 40° C. from a viewpoint of its handling.

In the neutralization step, the suspension is mixed with the basic substance to obtain a neutralized suspension containing HPMCP.

The neutralized suspension containing HPMCP has a pH value of preferably from 2.00 to 6.90, more preferably from 3.00 to 6.50, still more preferably from 3.90 to 5.00, and further more preferably from 4.50 to 4.80, from a viewpoint of obtaining HPMCP with low impurities. HPMCP has carboxybenzoyl groups (—$COC_6H_4COOH$), so that when it is neutralized, for example, with sodium hydroxide, sodium salts (—$COC_6H_4COONa$) are formed, thereby making HPMCP water soluble. To avoid this, the pH is preferably on the acidic side. Even if partial dissolution occurs, HPMCP can be precipitated by the addition of an acid.

It should be noted that the pH value of the neutralized suspension containing HPMCP may be determined by the procedure described in "2.54 pH Determination" under "General Tests, Processes and Apparatus; 2. Physical Methods" in the Japanese Pharmacopoeia 17th Edition.

The precipitation step and the neutralization step may be conducted simultaneously. In other words, the neutralization step may be conducted, while the precipitation step being conducted, or the precipitation step may be conducted while the neutralization step being conducted.

More specifically, for example, the reaction product solution containing HPMCP may be mixed with an aqueous solution of the basic substance to cause neutralization and precipitation simultaneously, or the reaction product solution containing HPMCP may be mixed with water to cause precipitation of the HPMCP while the basic substance being added to effect the neutralization.

Next, there will be described the washing step of washing the HPMCP contained in the neutralized suspension to obtain the washed HPMCP.

The washing method is not particularly limited. Examples of the washing method include a method comprising steps: subjecting the neutralized suspension to such a treatment as centrifugation, filtration or decantation to obtain crude HPMCP; dispersing the crude HPMCP in water, while stirring with a stirrer; and then removing the water used for washing, for example, by centrifugation or filtration; a method comprising a step of subjecting the crude HPMCP to a continuous flow of water; and a method comprising a step of repeatedly replacing a portion of the liquid in the neutralized suspension containing HPMCP by water.

The centrifugation or filtration may be carried out with an apparatus equipped with a screen or filter cloth.

The screen may be made of any of metal, glass or ceramic material. It is preferably made of metal such as stainless steel, aluminum or iron from a viewpoint of durability. The screen may be in any form insofar as it has openings through which filtration can be carried out. Examples of the screen include metal mesh, punching sheet and molded resin mesh. The punching sheet is preferred from a viewpoint of filterability.

The mesh opening size of the screen may be suitably selected depending on the size of crude HPMCP. The mesh opening size is preferably in the range of from 40 to 2,000 μm from a viewpoint of minimizing the loss of crude HPMCP. The filtration area of the screen may be suitably selected in consideration of the amount of the reaction product solution and the filtration speed. It is preferably from 0.001 to 1,000 m$^2$ from a viewpoint of the filtration speed.

The crude HPMCP as obtained, e.g., by centrifugation or filtration, has a water content of preferably from 10 to less than 100%, based on the total mass of the crude HPMCP. The water content of HPMCP may be determined in accordance with the procedure described in "2.41 Loss on Drying Test" under "General Tests, Processes and Apparatus; 2. Physical Methods" in the Japanese Pharmacopoeia 17th Edition. More specifically, the water content of HPMCP is defined as [{(total mass of HPMCP)−(absolute dry mass of HPMCP)}/(total mass of HPMCP)]×100%, wherein "total mass of HPMCP" means the exact mass of HPMCP determined in accordance with the procedure described in "2.41 Loss on Drying Test" in the Japanese Pharmacopoeia 17th Edition, and "absolute dry mass of HPMCP" means the mass of dried HPMCP determined in accordance with the procedure described in "2.41 Loss on Drying Test" in the Japanese Pharmacopoeia 17th Edition. The water content of crude HPMCP can be determined in the same manner by replacing the term "HPMCP" by "crude HPMCP".

The temperature of water to be used for washing is preferably from 5° C. to 40° C. from a viewpoint of efficient removal of impurities from HPMCP.

The amount of water to be used for washing may vary depending on a particular method of washing. For example, when crude HPMCP obtained by centrifugation or filtration is washed, the water is used preferably in an amount of from 200 to 20,000 parts by mass, relative to 100 parts by mass of the crude HPMCP obtained by centrifugation or filtration, from a viewpoint of obtaining HPMCP with low impurities.

The water to be used for washing may contain an optional basic substance from a viewpoint of efficient removal of impurities from HPMCP.

The stirrer may be any stirrer having at least one rotating impeller and being capable of uniformly dispersing HPMCP. The impeller may be in the form of a paddle, ribbon or anchor.

The peripheral speed of the impeller during stirring is preferably from 0.2 to 100.0 m/s, from a viewpoint of preventing HPMCP from precipitating. The stirring period of time is preferably from 5 to 300 minutes from a viewpoint of uniformly dispersing HPMCP.

The number of washing may be selected so as to obtain a desired purity of HPMCP. The number of washing is preferably from 1 to 30 times from a viewpoint of productivity.

HPMCP thus obtained may be optionally dried. The drying temperature may be preferably from 40 to 100° C., more preferably from 40 to 80° C., from a viewpoint of preventing HPMCP from agglomerating. The drying period of time may be preferably from 1 to 20 hours, more preferably from 3 to 15 hours, from a viewpoint of preventing HPMCP from agglomerating.

HPMCP has a DS of methoxy groups of preferably from 1.10 to 2.20, more preferably from 1.40 to 2.00, and still more preferably from 1.60 to 2.00.

HPMCP has an MS of hydroxypropoxy groups of preferably from 0.10 to 1.00, more preferably from 0.20 to 0.80, and still more preferably from 0.20 to 0.65.

HPMCP has a DS of carboxybenzoyl groups of preferably from 0.10 to 2.50, more preferably from 0.10 to 1.00, and still more preferably from 0.40 to 0.80.

It should be noted that the respective molar substitution degrees of methoxy, hydroxypropoxy and carboxybenzoyl groups in HPMCP may be determined by calculation from values measured in accordance with the methods described under the headings of "Hypromellose" and "Hypromellose Phthalate" in Official Monographs of the Japanese Pharmacopoeia 17th Edition.

A 10% by mass solution of HPMCP in a mixed solvent of methanol and methylene chloride (a mass ratio of methanol to methylene chloride of 1:1) has a viscosity at 20° C. of preferably from 10.0 to 300.0 mPa·s, more preferably from 15.0 to 250.0 mPa·s, and still more preferably from 15.0 to 220.0 mPa·s. The viscosity at 20° C. of the 10% by mass solution of HPMCP in mixed solvent of methanol and methylene chloride (a mass ratio of methanol to methylene chloride of 1:1) may be determined with an Ubbelohde viscometer in accordance with the method described under the heading of "Hypromellose Phthalate" in Official Monographs of the Japanese Pharmacopoeia 17th Edition.

EXAMPLES

The invention will be further described with reference to the following Examples and Comparative Example. It should not be construed that the invention is limited to or by Examples.

Example 1

In a 5-L kneader reactor equipped with a twin-shaft stirrer, 860.0 g g of HPMC having a DS (methoxy) of 1.87, an MS (hydroxypropoxy) of 0.24, and a viscosity at 20° C. of 6.0 mPa·s as determined in a 2 mass % aqueous solution, 1418.0 g of acetic acid, 720.3 g of phthalic anhydride, 356.0 g of sodium acetate, and 16.7 g of sodium chlorate were placed, and stirred at 85° C. for 5 hours to obtain 3371.0 g of a reaction product solution containing HPMCP. Then, 1556.8 g of water was added to the reaction product solution to obtain 4927.8 g of a post-treated reaction product solution containing HPMCP. Table 1 shows the equivalence relationship between the reagents used for the esterification reaction.

Fifty grams of the post-treated reaction product solution containing HPMCP was mixed with 150 g of a 0.9% by mass aqueous NaOH solution of 13.2° C. as the simultaneous precipitation and neutralization steps to obtain a neutralized suspension containing HPMCP. The neutralized suspension had a pH value of 4.33.

The neutralized suspension was filtered through a screen (stainless steel punching sheet with a filtration area of 10.2 cm$^2$) having each opening of 300 μm until no further filtrate was obtained, to obtain 52 g of crude HPMCP. The crude HPMCP obtained by the filtration had a water content of 75%.

The crude HPMCP obtained by the filtration was dispersed in 600 g of water of 13.2° C., stirred with a stirrer having a rotating paddle-like impeller at a peripheral speed of 0.65 m/s for 10 minutes, and then filtered through a screen (stainless steel punching sheet with a filtration area of 10.2 cm$^2$) having each opening of 300 μm until no further filtrate was obtained. Then, this washing procedure was repeated twice to obtain a wet cake containing HPMCP. The wet cake was dried in an air-blowing dryer at 50° C. for 12 hours to obtain dried HPMCP.

The contents of phthalic acid and acetic acid in the dried HPMCP were determined in accordance with the method described in the Japanese Pharmacopoeia 17th Edition. The results are shown in Table 2.

Example 2

A post-treated reaction product solution containing HPMCP was obtained in the same manner as in Example 1. Fifty grams of the post-treated reaction product solution containing HPMCP was mixed with 150 g of water of 13.2° C. to obtain a suspension of precipitated HPMCP.

The HPMCP suspension was mixed with 2.7 g of a 49% by mass aqueous NaOH solution of 13.5° C. to obtain a neutralized suspension containing HPMCP. The neutralized suspension had a pH value of 4.24.

The neutralized suspension was filtered through a screen (stainless steel punching sheet with a filtration area of 10.2 cm$^2$) having each opening of 300 μm until no further filtrate was obtained, to obtain 54 g of crude HPMCP. The crude HPMCP obtained by the filtration had a water content of 76%.

The crude HPMCP was dispersed in 600 g of water of 13.2° C., stirred with a stirrer having a rotating paddle-like impeller at a peripheral speed of 0.65 m/s for 10 minutes, and then filtered through a screen (stainless steel punching sheet with a filtration area of 10.2 cm$^2$) having each opening of 300 μm until no further filtrate was obtained. Then, this washing procedure was repeated twice to obtain a wet cake containing HPMCP. The wet cake was dried in an air-blowing dryer at 50° C. for 12 hours to obtain dried HPMCP.

The contents of phthalic acid and acetic acid in the dried HPMCP were determined in accordance with the method described in the Japanese Pharmacopoeia 17th Edition. The results are shown in Table 2.

Example 3

Dried HPMCP was obtained in the same manner as in Example 2 except that the 49% by mass aqueous NaOH solution of 13.2° C. was used in an amount of 4.9 grams. The results are shown in Table 2.

Example 4

Dried HPMCP was obtained in the same manner as in Example 2 except that the 49% by mass aqueous NaOH solution of 13.2° C. was used in an amount of 6.5 grams. The results are shown in Table 2.

Example 5

Dried HPMCP was obtained in the same manner as in Example 2 except that 10.0 g of solid sodium hydrogen carbonated was used in place of 2.7 g of the 49% by mass aqueous NaOH solution. The results are shown in Table 2.

Comparative Example 1

Dried HPMCP was obtained in the same manner as in Example 1 except that 600 g of water of 13.2° C. was used in place of 150 g of the 0.9% by mass aqueous NaOH solution of 13.2° C., thereby obtaining an un-neutralized suspension containing HPMCP. The results are shown in Table 2.

It is found that the washability for removing carboxylic acid compounds such as acetic acid and phthalic acid is improved by the neutralization treatment of the suspension containing a precipitate of HPMCP. It is considered that this is because HPMCP particles become less adhesive by the neutralization treatment, thereby preventing the particles from agglomerating each other, and making impurities less susceptible to being entrapped in the particles. Another factor for the improved washability is considered to be enhanced solubility of the carboxylic acid compounds in water by the neutralization treatment.

TABLE 1

| HPMC | | aliphatic monocarboxylic acid | | carboxybenzoylating agent | | catalyst | | depolymerizing agent | |
|---|---|---|---|---|---|---|---|---|---|
| | | acetic acid | | phthalic anhydride | | sodium acetate | | sodium chlorate | |
| (g) | (mol) | (g) | (mol/molHPMC) | (g) | (mol/molHPMC) | (g) | (mol/molHPMC) | (g) | (mol/molHPMC) |
| 860.0 | 4.3 | 1418.0 | 5.6 | 720.3 | 1.1 | 356.0 | 1.0 | 16.7 | 0.04 |

TABLE 2

| | neutralization step | | HPMCP | | | | washability | |
| | | | viscosity | MeO | HPO | CBz | phthalic acid content in dried product | acetic acid content in dried product |
| | basic substance | pH | (mPa·s) | group | group | Group | (% by weight) | (% by weight) |
|---|---|---|---|---|---|---|---|---|
| Example 1 | sodium hydroxide | 4.33 | 42.0 | 1.84 | 0.25 | 0.67 | 0.23 | 0.39 |
| Example 2 | sodium hydroxide | 4.24 | 42.0 | 1.84 | 0.25 | 0.67 | 0.22 | 0.42 |
| Example 3 | sodium hydroxide | 4.44 | 42.0 | 1.84 | 0.25 | 0.67 | 0.19 | 0.42 |
| Example 4 | sodium hydroxide | 4.67 | 42.0 | 1.84 | 0.25 | 0.67 | 0.15 | 0.41 |
| Example 5 | sodium hydrogen carbonate | 4.67 | 42.0 | 1.84 | 0.25 | 0.67 | 0.16 | 0.41 |
| Comp. Ex. 1 | — | | 3.85 | 42.0 | 1.84 | 0.25 | 0.67 | 0.26 | 0.43 |

"MeO" means methoxy,
"HPO" means hydroxypropoxy, and
"CBz" means carboxybenzoyl.

The invention claimed is:

1. A method for producing hypromellose phthalate, comprising:
   an esterification step of esterifying hypromellose with phthalic anhydride in the presence of an aliphatic carboxylic acid to obtain a reaction product solution containing hypromellose phthalate;
   a precipitation step of precipitating the hypromellose phthalate by mixing the reaction product solution with water to obtain a suspension of the precipitated hypromellose phthalate;
   a pH-increasing step of mixing the suspension with a basic substance to obtain a pH-increased suspension having a pH value of from 3.90 to 5.00; and
   a washing step of washing the hypromellose phthalate contained in the pH-increased suspension to obtain the washed hypromellose phthalate.

2. The method for producing hypromellose phthalate according to claim 1, wherein the precipitation step and the pH-increasing step are conducted simultaneously.

3. The method for producing hypromellose phthalate according to claim 1, wherein the pH-increased suspension has a pH value of from 4.24 to 5.00.

4. The method for producing hypromellose phthalate according to claim 1, wherein the basic substance is an alkali metal hydroxide and/or an alkali metal hydrogen carbonate.

5. The method for producing hypromellose phthalate according to claim 2, wherein the pH-increased suspension has a pH value of from 4.24 to 5.00.

6. The method for producing hypromellose phthalate according to claim 2, wherein the basic substance is an alkali metal hydroxide and/or an alkali metal hydrogen carbonate.

7. The method for producing hypromellose phthalate according to claim 3, wherein the basic substance is an alkali metal hydroxide and/or an alkali metal hydrogen carbonate.

8. The method for producing hypromellose phthalate according to claim 5, wherein the basic substance is an alkali metal hydroxide and/or an alkali metal hydrogen carbonate.

* * * * *